Figure 1:
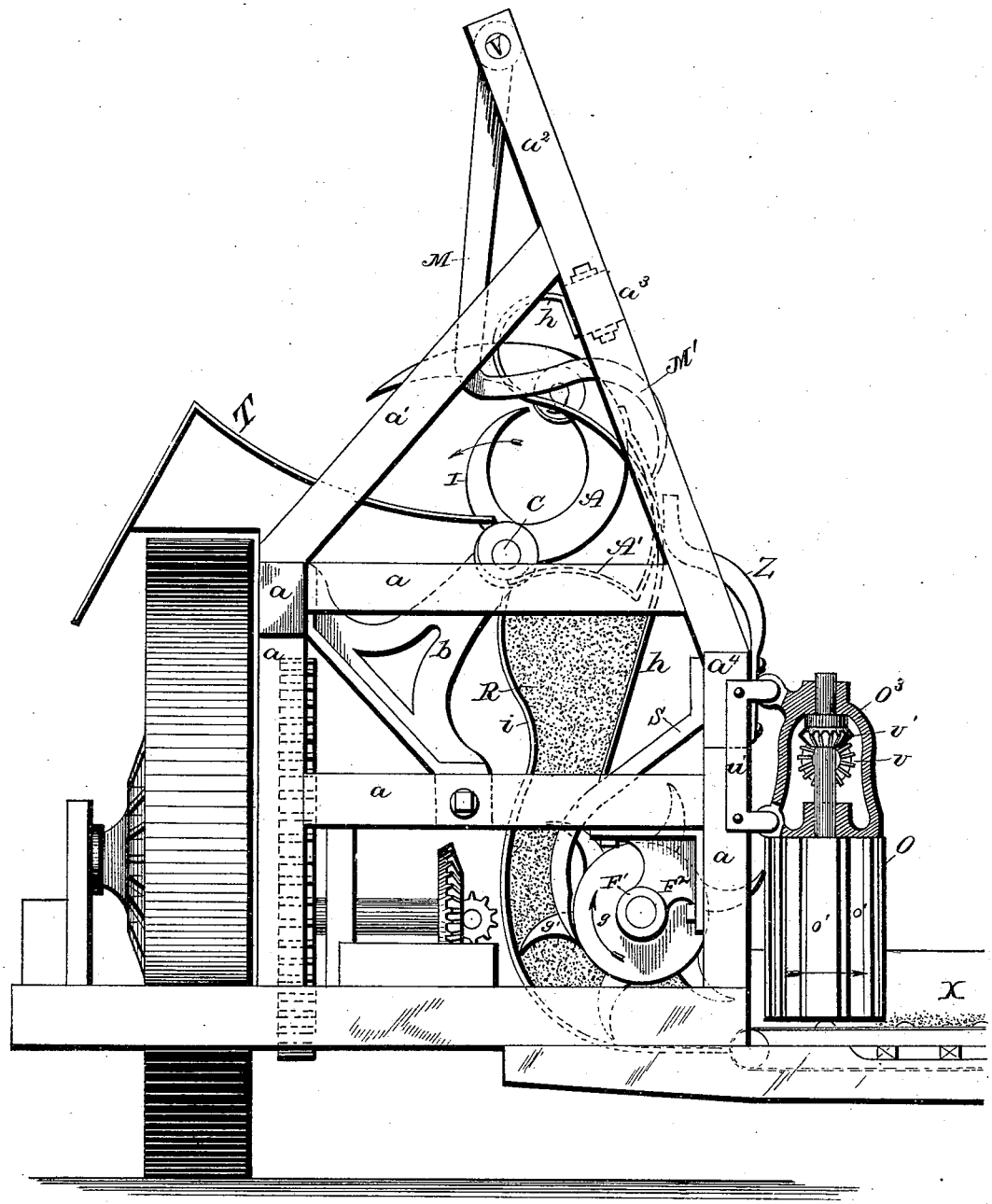

(No Model.)  F. OGDEN.  10 Sheets—Sheet 3.
GRAIN BINDER.

No. 312,154.  Patented Feb. 10, 1885.

(No Model.)  10 Sheets—Sheet 4.

F. OGDEN.
GRAIN BINDER.

No. 312,154.  Patented Feb. 10, 1885.

WITNESSES
Herman Moran.
E. J. Nottingham

INVENTOR
Ferris Ogden.
By H. A. Symon,
ATTORNEY

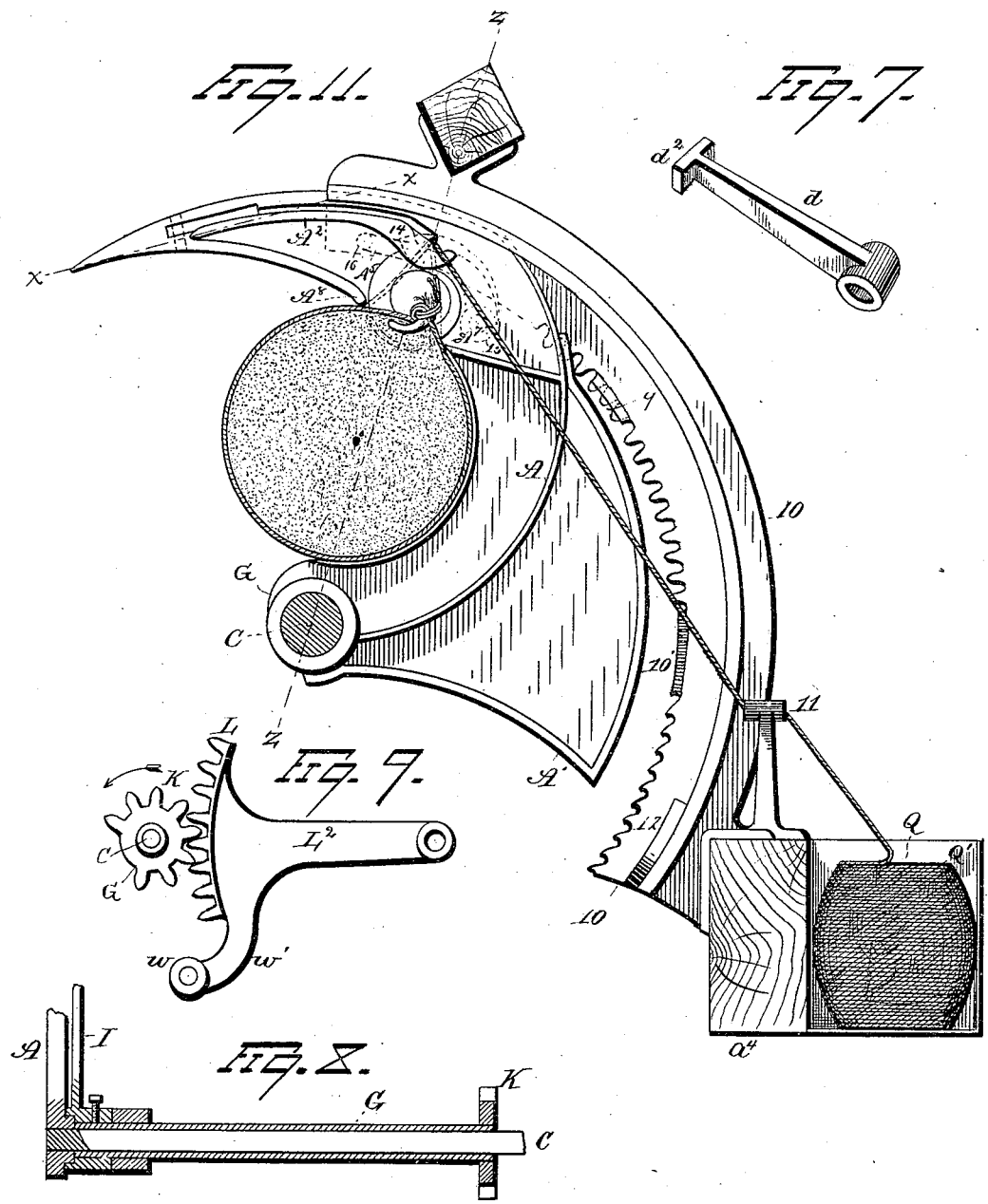

(No Model.)         10 Sheets—Sheet 7.
F. OGDEN.
GRAIN BINDER.
No. 312,154.   Patented Feb. 10, 1885.
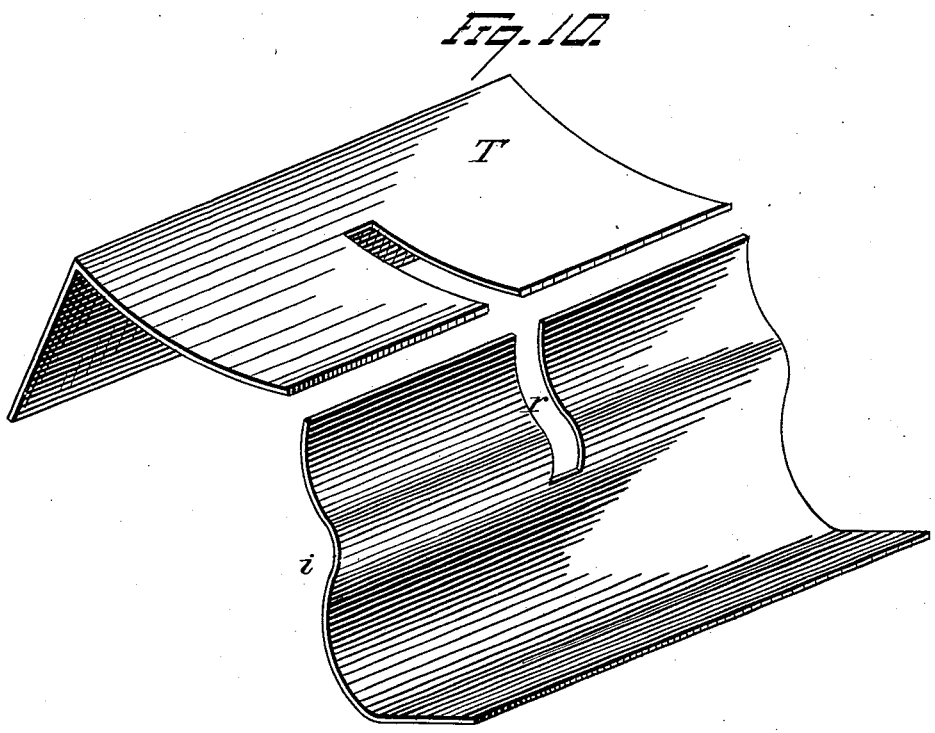
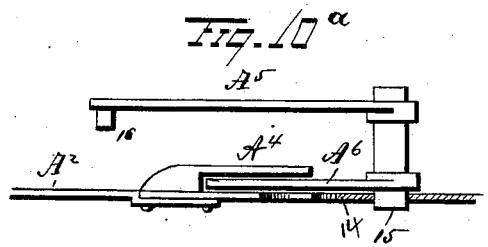
WITNESSES            INVENTOR (No Model.) 10 Sheets—Sheet 8.
F. OGDEN.
GRAIN BINDER.
No. 312,154. Patented Feb. 10, 1885.
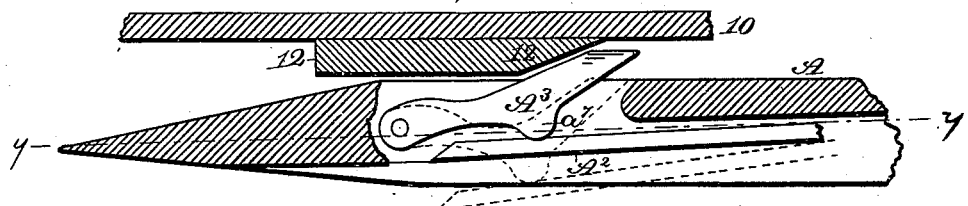
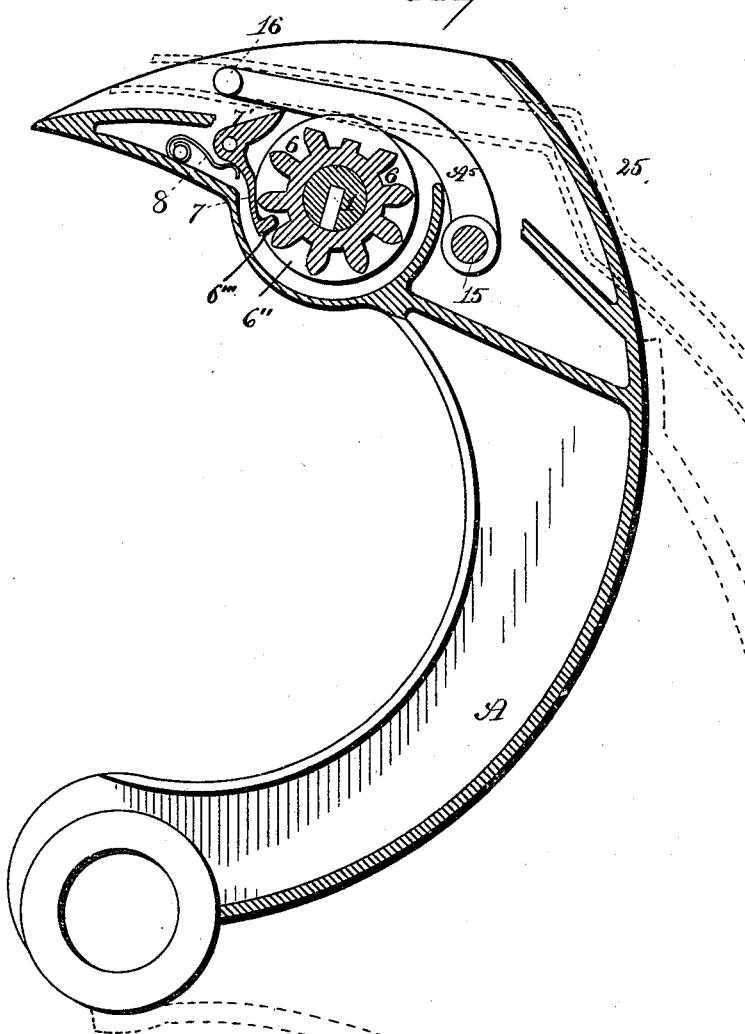
WITNESSES
INVENTOR
ATTORNEY

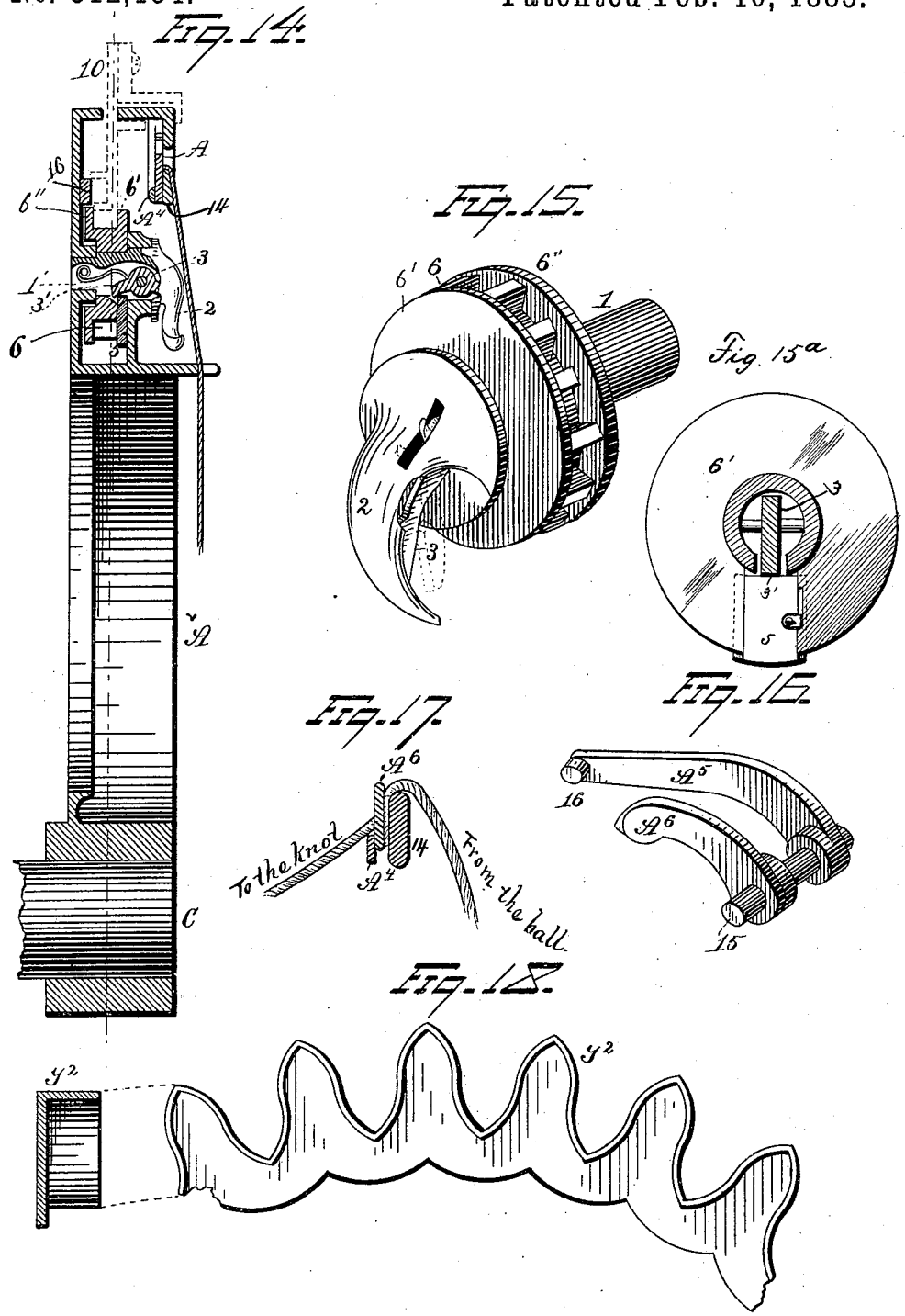

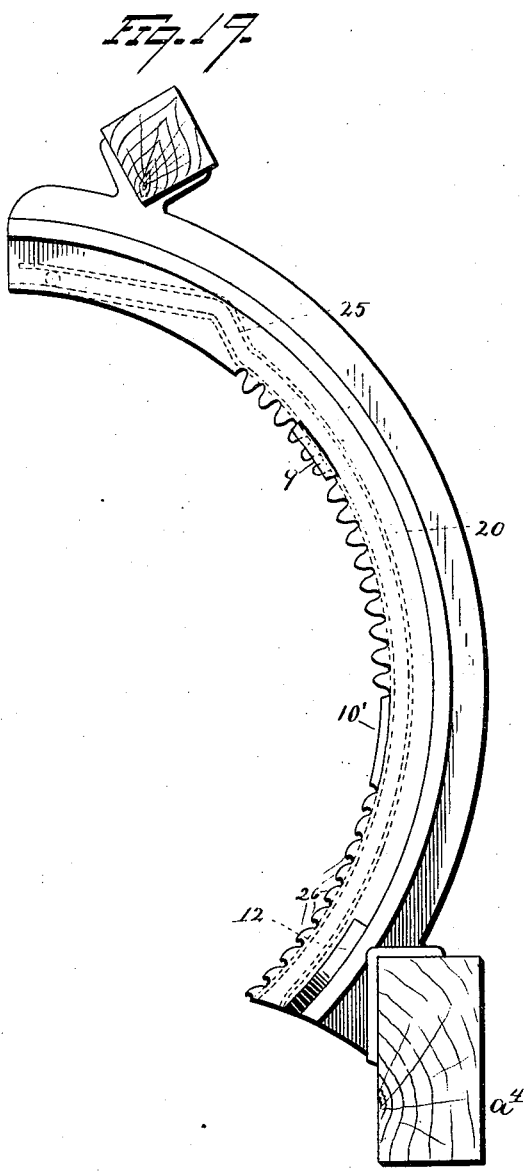

UNITED STATES PATENT OFFICE.

FERRIS OGDEN, OF MANSFIELD, OHIO.

GRAIN-BINDER.

SPECIFICATION forming part of Letters Patent No. 312,154, dated February 10, 1885.

Application filed January 5, 1882. (No model.)

*To all whom it may concern:*

Be it known that I, FERRIS OGDEN, of Mansfield, in the county of Richland and State of Ohio, have invented certain new and useful Improvements in Grain-Binders; and I do hereby declare the following to be a full, clear, and exact description of the invention, such as will enable others skilled in the art to which it pertains to make and use the same.

My invention relates to a grain-binder to be used as an attachment to a harvesting-machine, its object being to lighten and simplify the construction of binders of this class; and it consists in certain improved devices and combinations thereof, which will be hereinafter particularly described, and pointed out in the claims.

It has been customary in binders of this class to cause the tripping, or starting into operation, of the gavel forming and binding devices by causing the grain to be pressed against the compressor-arm, which operates in conjunction with the binding-arm, so that the binding-arm as it comes around to separate the gavel must penetrate and pass through a tightly-compressed mass of grain, the resistance of which greatly retards the working of the entire apparatus, and necessitates great strength of construction.

In my improvement I cause the tripping by the pressure of the grain against the rear of the binding-arm in such manner that at the proper moment the said arm is started on its revolution and relieves the grain of pressure, so that when said arm comes around to form the gavel it passes through a loose mass of grain, which offers but little resistance to its passage, so that the separation of the gavel is easily effected, and without any extra strain upon the parts in this part of their operation.

Further improvement consists in the combination, with the devices which deliver the grain to the binder, of a novel device for moving the grain endwise to such position that the binding-cord may be tied directly around the middle of the gavel.

I have also made improvements in the devices for tying the knot in the binding-cord, whereby these devices may be accurately adjusted to operate at the proper moment without any loss of time in timing up, and have devised a novel combination of devices for stopping and starting the binding-arm and compressing-arms in proper relation to each other, and an improved gavel-ejecting mechanism.

Figure 2:
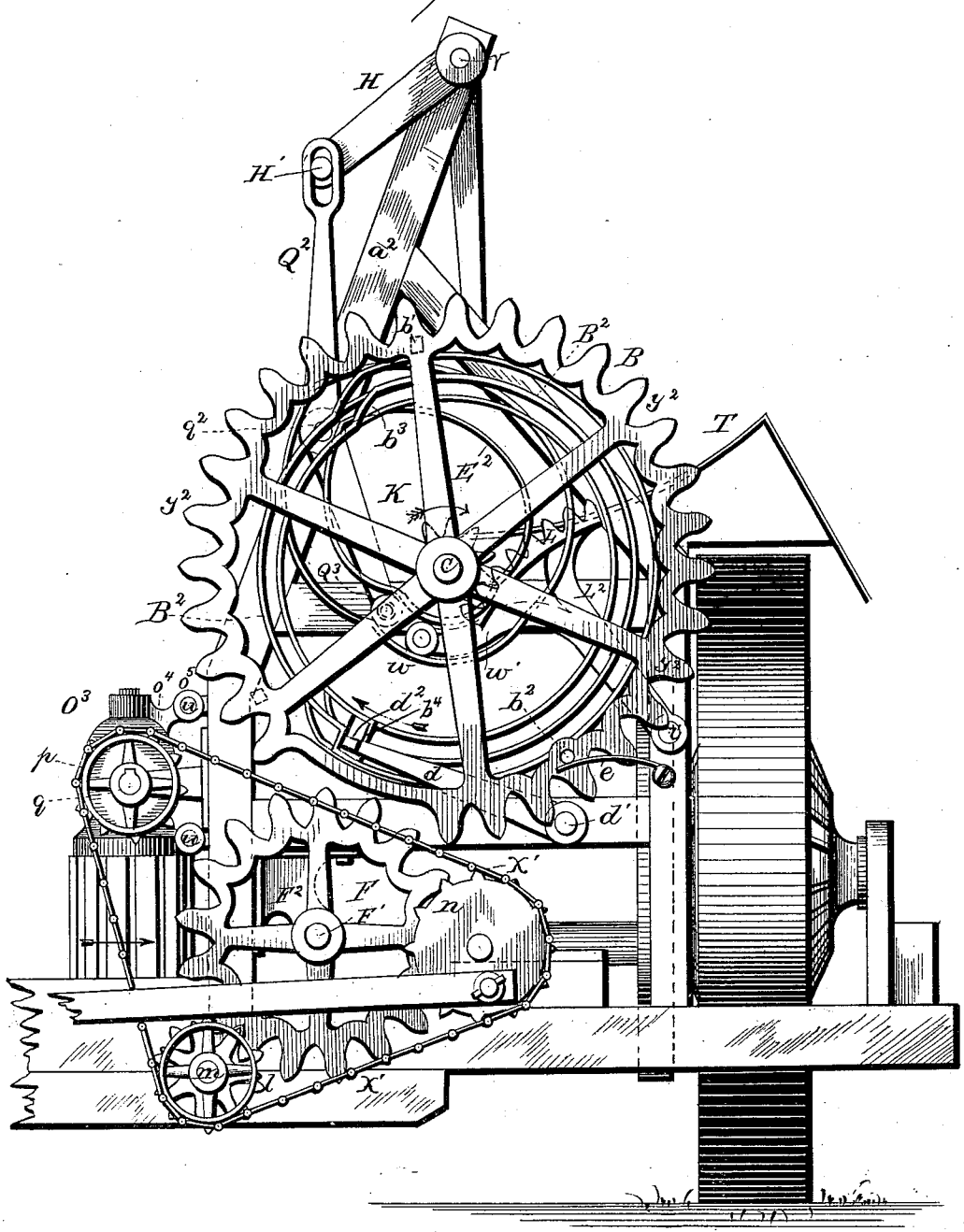
Figure 3:
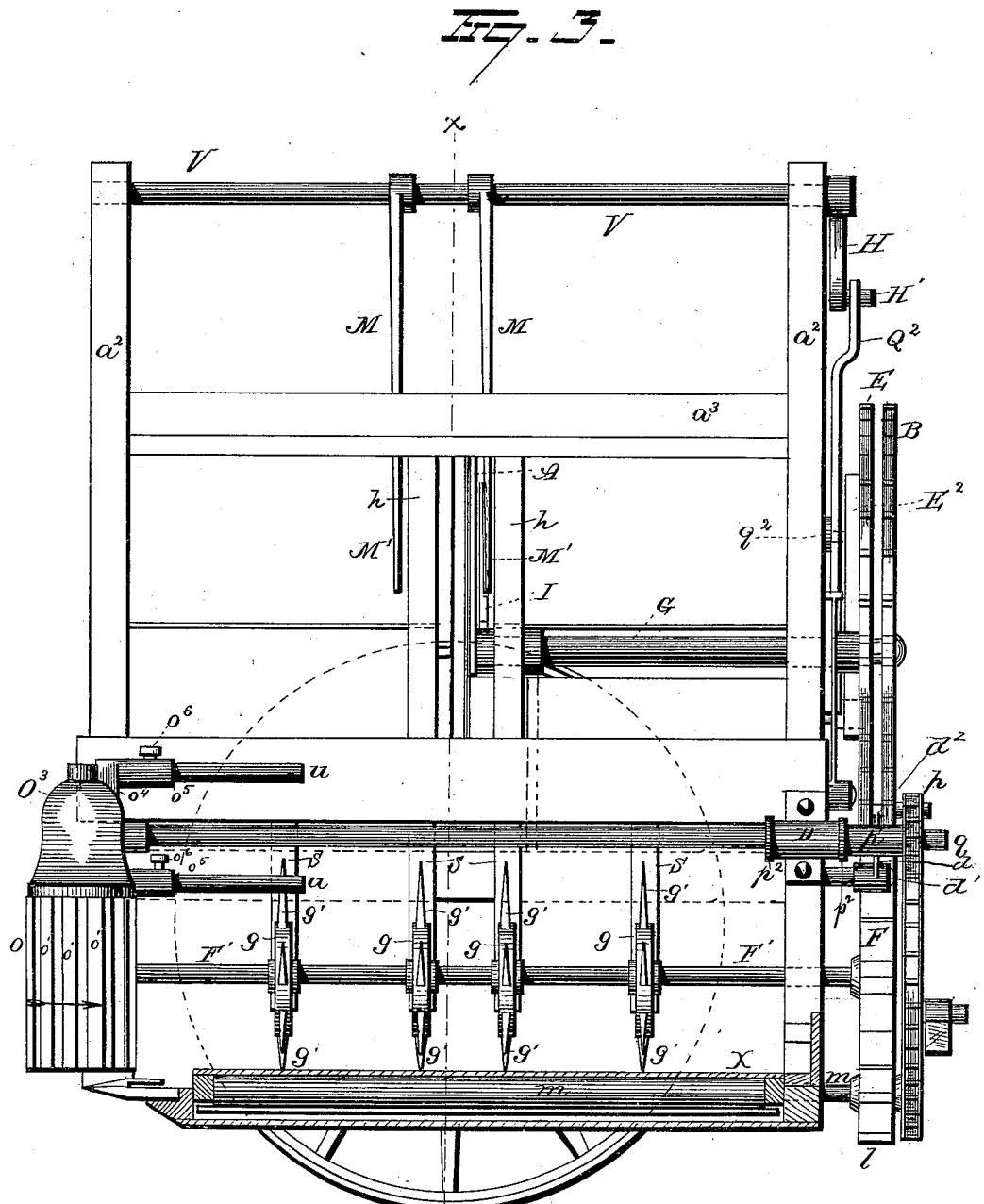
Figure 4:
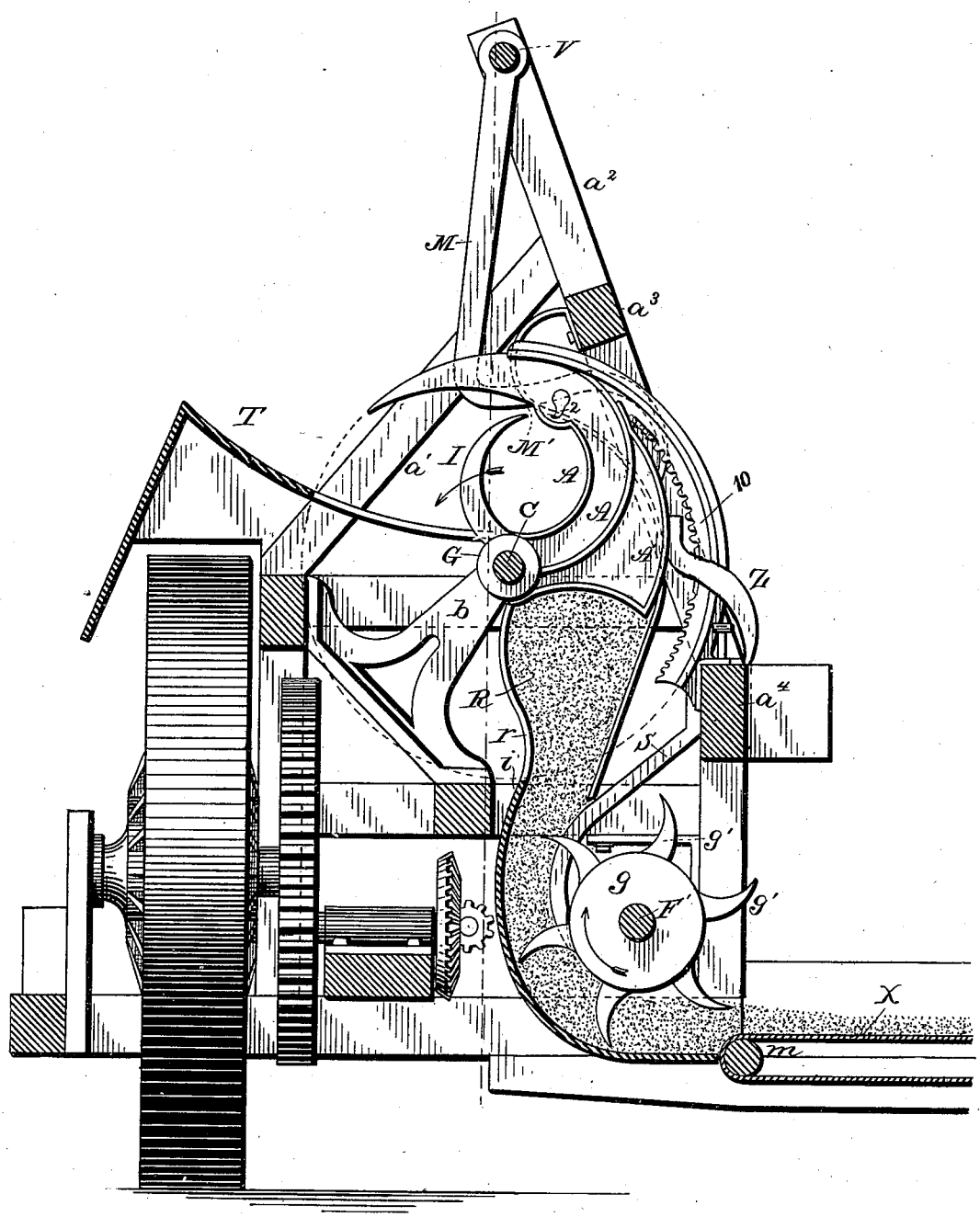
Figure 5:
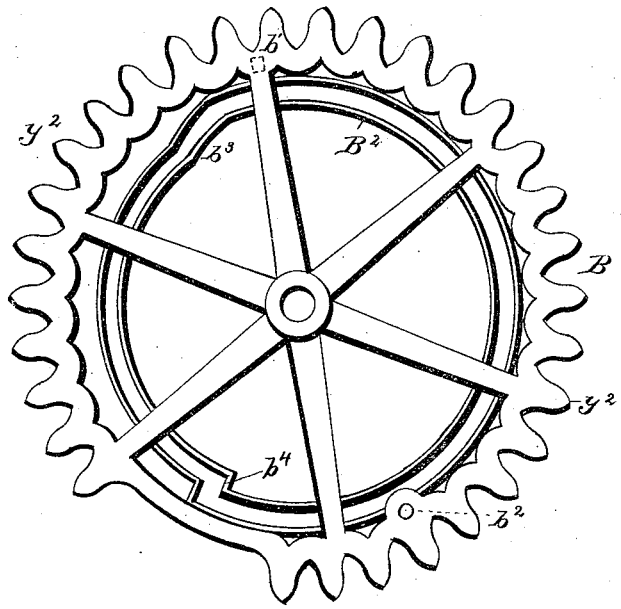
Figure 6:
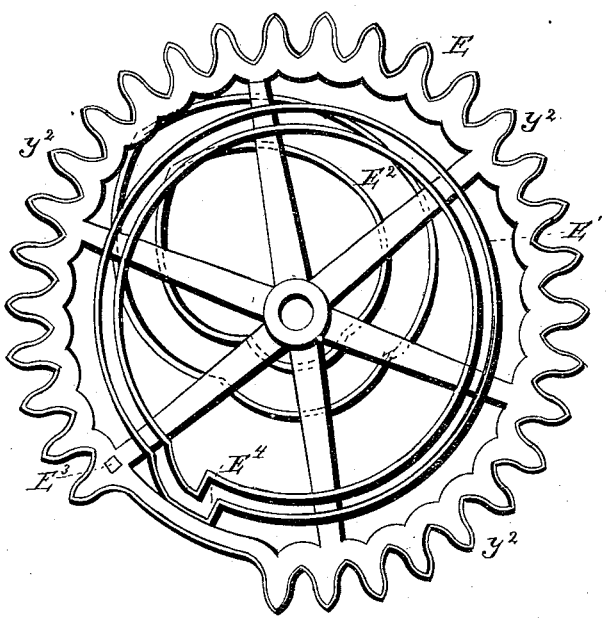

In the accompanying drawings, Figure 1 is a front end view of my improved binder as arranged in connection with a harvester. Fig. 2 is a rear end view of the same. Fig. 3 is partly a side elevation and partly a vertical section of the machine viewed from the side on which is arranged the feeding-apron. Fig. 4 is a section on line $x$ $x$ of Fig. 3. Fig. 5 is a view of the outer spur-wheel of the binding-arm shaft with its attached cam-groove. Fig. 6 is a view of the spur-wheel which is secured to the compressor-arm sleeve, said wheel being provided with cam-grooves on opposite sides. Fig. 7 is a detached view of the latch-arm which operates in connection with cam-grooves of the two spur-wheels. Fig. 8 is a view, partly in section, illustrating the relation of the binder-arm shaft and the surrounding sleeve which carries the compressor-arm. Fig. 9 is a view of the devices for transmitting motion from the cam-groove of the inner spur-wheel to the sleeve carrying the compressor-arm. Fig. 10 is a perspective view illustrating the construction of one side of the grain-receiver. Fig. 11 is an enlarged view of the binder-arm arranged in proper relation to the stationary rack which operates the knot-tyer. Fig. 12 is a top view of the binder-arm, partially in section, on the line $x$ $x$ of Fig. 11. Fig. 13 is a section of the binder-arm on the line $y$ $y$, Fig. 12, the stationary rack being shown in dotted lines. Fig. 14 is a section on line $z$ $z$, Fig. 11. Fig. 15 is a detached perspective view of the knot-tyer, the flanged spur-wheel, and its slide for operating the clamping-finger. Fig. 15ª is a section through the shaft of the knotter-shaft just behind the fixed jaw, and showing a side view of the pinion and slide. Fig. 16 is a detached perspective view of the cord gripping and cutting devices. Fig. 17 is a detail cross-section illustrating the action of the spring-finger which catches the cord and guides it into the slot in the binder-arm. Fig. 18 is a view in perspective and section of a portion of a rim of one of the main spur-wheels, illustrating the construction of the same. Fig. 19 is a side view of the stationary rack-bar detached and in its proper position.

The frame-work of the machine is constructed of the timbers $a\ a'\ a^2\ a^3\ a^4$, some of which will be referred to in detail hereinafter. The binding-arm A is fixed upon the inner end of a shaft, C, mounted in brackets $b$, said shaft having fixed upon its outer end a large spur-gear, B, which serves not only to transmit motion to the shaft and binder-arm, but is also provided with a cam-groove, presently to be described, which forms an element of a combination of stop-motion devices. Loosely upon the shaft C, inwardly from the wheel B, is mounted a similar spur-wheel, E, which carries on its side adjacent to the wheel B a cam-groove, E', the two wheels being such a distance apart that the opposite ends of a cross-head, $d^2$, of an arm, $d$, will enter the cam-grooves respectively, said arm being pivoted at $d'$ to one of the timbers of the frame-work.

The particular configuration of the cam-grooves will be explained in describing their operation. The wheel B carries on its inner side, and outside of the cam-groove, a lug, (shown in dotted lines at $b'$,) and the wheel E carries a similar lug, $E^3$, which projects into the path of the lug $b'$, so that it will be struck by said lug, and the wheel E will be carried forward at such time by the revolution of the wheel B. The wheel B also carries an outwardly-projecting pin, $b^2$, which, as the wheel revolves, will strike against a spring, $e$, as shown in Fig. 2, one end of which is fixed to the frame-work of the machine. Both the wheels B and E have their gears mutilated—that is, several teeth are left out—thus leaving a blank space on the periphery of each wheel. Motion is transmitted to both the wheels B and E from a pinion, F, the gear-face of which is wide enough for that purpose. This pinion is fixed upon the end of a packer-shaft, F', having bearings in brackets $F^2$, and extending the whole length of the machine. This shaft is provided at intervals (see Fig. 3) with wheels $g$, having fingers $g'$, projecting from their peripheries, these fingers being for the purpose of carrying the grain forward, as will be further explained hereinafter. Motion is given to the pinion F by a smaller pinion, $l$, fixed to the end of the shaft $m$ of the endless grain-conveying apron X, and this smaller pinion is driven in turn by the chain X', common to most harvesters, and which passes over the sprocketed crank-wheel $n$. This same chain also passes over and gives motion to a sprocket-wheel, $p$, and a shaft, $q$, upon which the same is fixed. The office of the finger-wheels $g$ is to take the loose grain from the grain-receiving apron or belt X, upon which it is thrown by the ordinary reel, (not shown,) and force it upward into the receptacle R. This receptacle is formed of a curved plate, $i$, extending the whole length of the machine, and slotted, as shown at $r$, for the passage of the binder-arm and compressor-arm, and two curved strips, $h$, which extend downward from the timbers $a^3$ at a proper distance in front of the plate $i$. The lower ends of these strips $h$ are secured to two central stripper-arms of a series of pairs of stripper-arms, S, which extend inwardly from one of the longitudinal timbers of the frame-work, and serve to prevent the grain from being carried outward by the fingers $g'$. Instead of these strips $h$, I might use a solid plate extending the whole length of the machine and properly slotted for the passage of the binder-arm; but in practice I prefer to use the solid plate $i$ next the driving-wheel and the two strips $h\ h$ in front, as shown in Fig. 4.

The letter O indicates the butter, the office of which is to move the grain endwise, so that the middle of the gavel will always be in the path of the binder-arm. This butter O is a vertical cylinder provided with suitable peripheral projections, (ribs $o'$ being shown in the present instance,) which, as the cylinder revolves, will strike the grain as it comes on upon the apron X and move it a proper distance endwise rearward, the distance to which it is moved being regulated by the adjustment of the butter. The cylinder O receives motion from a shaft, $q$, a bevel-wheel, $v$, of which meshes with a similar bevel-gear, $v'$, fixed upon the shaft of the cylinder. This shaft passes through and has its bearings in a casing, $O^3$, (shown in section in Fig. 1 and in full lines in Figs. 2 and 3,) this casing inclosing the bevel gear-wheels, in order to protect them from the grain as it comes to the binder. The casing $O^3$ is provided with arms $o^4$, carrying sleeves $o^5$, which are arranged to slide upon short bars $u$, held in position by being attached to a plate, $u'$, secured to the frame-work. The shaft $q$ has one of its bearings in the casing $O^3$, and its other end passes through a sleeve-like hub, $p'$, with which the sprocket-wheel $p$ is provided, and is prevented from turning therein by spline-and-groove connection, but is free to move longitudinally therein. This sleeve-like hub turns in a bearing, D, fixed to the frame work, and is prevented from moving longitudinally therein by shoulders $p^2\ p^2$, with which it is provided at each end of said bearing, so that the sprocket-wheel will always be held in position for the action of the chain which drives it. Set-screws $o^6$ pass through the sleeves $o^5$, and hold them at any desired position upon the bars $u$. Now, when it is desired to give the butter-cylinder O a different position, it is only necessary to loosen these set-screws and slide the casing $O^3$ in the desired direction, the shaft $q$ at the same time sliding through the sleeve-like hub $p'$ of the sprocket-wheel $p$. When the desired adjustment has been made, the set-screws $o^6$ may be tightened up and will hold the parts in position. The shaft C, carrying the binding-arm A, is surrounded by a tubular shaft, G, to the inner end of which is fixed the curved compressor-arm I, while to the other end of said tubular shaft is fixed a segmental pinion, K, which engages with a segmental rack, L, carried by an arm, L², pivoted at l' to one of the vertical timbers of the frame-work, as shown in Fig. 2. The compressor-arm I is so positioned that the binder-arm A will just pass it without interfering. The arm L², carrying the segmental rack L, has a curved downward extension, w', upon the end of which is pivoted a roller, w, which engages in a cam-groove, E², fixed on the inner side of the wheel E, this cam-groove having the office of swinging the arm L², so that the rack L will be moved at the proper time to turn the segmental pinion K and the tubular shaft G, which carries the compressor-arm. Said cam-groove also operates the gavel-ejecting devices, as will be presently described.

I will now give a more detailed description of the binder-arm and its operation, and of the devices which it carries. This binder-arm has an abutment, A', projecting from its rear side, the lower edge of which normally stands across the top of the grain-receptacle, as shown in Figs. 1 and 4, and receives the pressure of the incoming grain, which starts the binder-arm and its shaft forward, so as to bring the spur-wheel B into gear with the pinion F, which, it will be understood, is constantly in motion when the machine is in operation. The binder-arm also carries the knot-tyer and cord grasper and cutter. The knot-tyer is composed of the fixed jaw 2, which is fixed upon one end of the short shaft 1, mounted transversely in the binder-arm near its point, the beak being arranged to turn in a recess in the side of the arm and the shaft 1, having fixed upon it at the opposite side of the arm a pinion, 6, having a flange, 6', in which is arranged a slide, 5, having a radial movement. The shaft 1 is slotted longitudinally, and in this slot is pivoted a jaw, 3, which curves downwardly behind the fixed jaw 2, and normally bears against the inner side of said jaw, owing to the action of a spring, 1', fixed in the slot of the shaft and bearing upon the tail 3' of the pivoted jaw.

At certain points in the operation of the knot-tyer the slide 5 is forced inwardly, by means hereinafter to be described, and strikes the tail 3' of the pivoted jaw, moving it in opposition to the spring and causing it to move or open away from the fixed jaw. In the periphery of a flange, 6'', on the opposite side of the pinion from that in which the slide 5 is arranged, a notch, 6''', is formed, in which engages a dog, 7, (see Fig. 13,) pivoted to the binder-arm and pressed in the proper direction for such engagement by means of a spring, 8. This dog, however, has an upwardly-inclined tail, 7', which, being pressed downward, causes the dog to be disengaged from the notch, so that the pinion may turn freely. The pinion 6 has three of its teeth partly cut away, in order to provide a locking surface while it is passing certain blank portions of the stationary rack which operates the pinion, and which will be presently described.

The recess in which the fixed jaw 2 turns extends toward the point of the binder-arm and its upper wall lies above the pinion 6. In the forwardly-extended portion of this recess is arranged a flat spring, A², between the upper edge of which and the upper wall of the recess is an intervening space. The tip of the spring bears against a suitable seat formed for it near the point of the binder-arm, and the rear end of said spring is fixed to a fixed curved finger, 14, extending a short distance downward from the upper wall of the recess, and so curved downward that its upper edge at its bend will form a guide for the binding-cord, as will presently be seen. Behind this finger, and at a little distance therefrom, is fixed a curved slightly-elastic cord-cutter, A⁴, (see Figs. 14 and 17,) the cutting-edge of which lies a little below the bend or cord-guide before referred to. A little behind the pinion 6 a shaft, 15, is journaled in the upwardly-projecting portion of the binder-arm, and upon said shaft is fixed a curved arm, A⁵, extending over and forwardly beyond the pinion, its forward end being provided with an inwardly-projecting lug, 16. Upon the same shaft, 15, is fixed a flat arm, A⁶, arranged to play between the cord-cutter A⁴ and the surface of the finger 14. The lug 16 during the latter portion of a revolution of the binder-arm travels in a cam-groove on the back side of the stationary rack-bar 10, which will presently be particularly described, and is so operated upon by said groove as to cause the arm A⁵ to turn the shaft 15 for forcing the arm A⁶ between the finger 14 and cord-cutter A⁴ and to remove it from such position, as required. The office of the spring A² is to engage the cord as it passes a proper point and draw said cord off the ball and forward with the binding-arm, and in order to so engage the cord its tip must be forced outwardly from the binding-arm, so that the cord will be caught between the spring and the binding-arm. This throwing out of the spring is performed by a bent arm, A³, which is pivoted in a slot in the binding-arm, as shown in Fig. 12, and is provided with a shoulder, A⁷, which bears against the inner side of the spring A². Normally the free end of the lever A³ projects outwardly through its slot, being pressed to this position by the spring A²; but when this free end is struck by a sidewise projection, 12, of the stationary rack-bar said arm will be forced inwardly, and shoulder A⁷, bearing against the spring A², will press said spring laterally, so that its tip will project outwardly beyond the surface of the binder-arm, opening a space to receive the cord. The stationary rack-bar 10 is secured by suitable lugs to the longitudinal timbers a³ and a⁴ of the frame-work. It is provided with a lateral projection, 12, near its lower end, the cam-groove 20 running along its inner edge and back side, as viewed in Fig. 19, and the long lug 9 projecting outwardly and downwardly at an intermediate point alongside its teeth. The lower toothed edge of this stationary rack-bar projects into a longitudinal aperture in the top of the binder-arm, as shown in dotted lines in Fig. 14, and stands between the arms $A^5$ and $A^6$ when the binder-arm is rising and following the upper portion of its path. The ball of cord Q is arranged in a suitable receptacle, Q', attached to the frame-work, and its end is drawn through a suitably-supported eye, 11, a proper distance to be caught by the spring $A^2$.

I will now explain the operation of the binding and cord catching, holding, tying, and cutting devices, and afterward pass to a description of the gavel-ejecting devices. Before the machine is started the free end of the binding-cord is drawn through the eye 11 and secured to the binder-arm by being jammed in between the arm $A^6$ and the finger 14. Grain is thrown upon the apron X by the ordinary harvester-reel, (not shown,) and is carried along by the apron until it comes to the butter O, which revolves in the direction of the arrow, Figs. 1 and 3, and which, being properly adjusted, shoves the grain endwise, so as to bring it in position to have the cord in the middle of the gavel. After passing the butter the straw is seized by the fingers $g'$ and forced through the narrow opening between the plate $i$ and strippers S up into the receptacle R. When this receptacle is properly filled, the straw presses against the abutment $A'$ of the binder-arm A. As the arm A and the spur-wheel B are both secured to the shaft C, the resistance of the arm A to the pressure of the straw is governed by the resistance of the spring $e$, against which bears the pin $b^2$, which projects from the wheel B, and rests against said spring when the binder-arm is in its normal position. When the pressure of the straw against the abutment $A'$ is sufficient to overcome the resistance of the spring $e$, the wheel B is forced ahead and brought into gear with the pinion F. It will be understood that the mutilated portion of the wheel B is opposite this pinion F before the binder-arm begins to move. As the pinion F, as before stated, is constantly in motion, as soon as the engagement with it of the wheel B is effected it carries said wheel around.

To prepare the machine for operation, the binder-arm is turned up to its highest position, as shown in Fig. 11, and the cord is drawn up through the eye 11, passed in through the slot over the finger 14, as shown in Fig. 11, and has its end jammed between said finger and the cutter-arm $A^6$, as shown in Fig. 17. When the binder-arm is first started, it passes around until its point, passing through the slot in the plate $i$ and table T, passes through the straw and divides the gavel from the incoming grain. As the cord is carried around the gavel it is caught by a shoulder, $A^7$, formed by a projecting flange on the inner edge of the binder-arm, and said arm in continuing its course carries the cord entirely around the gavel, and when the point of the spring $A^2$ is about to pass the eye 11 the end of the lever $A^3$ strikes the projection 12 at the lower end of the rack-bar 10, this projection forcing the lever inward, so that the shoulder $a^7$ presses the spring $A^2$ outward, as shown in dotted lines, Fig. 12, so that the cord will be caught in the space behind the said spring. Then, as the lever $A^3$ passes off the projection 12, said lever flies back to its normal position, and yields to allow the cord to pass between its shoulder $a^7$ and the spring, which at the same time resumes its normal position. The cord now slips back along the upper edge of the spring and behind the stationary cutter $A^4$, and is stopped at the end of the slot above the finger 14, being then stretched across the cutter $A^4$, and having been forced behind a shoulder, $A^8$, on the binder-arm, and which is opposite the shoulder $A^7$, and is the terminus of a flange on the front part of the lower edge of the binder-arm. The placing of the cord behind this shoulder is effected by a spring, Z, which wipes the edge of the flange as the latter passes after the cord has been caught by the spring. A little before the parts have reached the positions just described the lug 16 of arm $A^5$ enters the lower end of the groove 20 in the rack-bar 10, so as to prevent said arm from moving. The binder-arm now begins to compress the gavel against the compressor-arm, which for the present remains stationary. Both end portions of the cord which is around the gavel are now stretched in the path of the knotter, and as the binder-arm continues to rise the tail 7' of the dog 7 is struck by the long tooth 10' of the rack-bar, so that the dog is thrown out of engagement with the notch in the flange of the pinion 6, and the teeth of said pinion engage with the regular teeth of the rack-bar, so that in the further revolution of the binder-arm the pinion and the knot-tyer are caused to revolve, there being a sufficient number of teeth on the rack-bar to give said knotter two complete revolutions. As the knotter rests between the strands of the cord at the commencement of its revolutions, the first revolution of the knotter is simply for the purpose of getting both strands or ends of the cord on one side of the knotter, so as to be in a position to be tied by the second revolution. During the latter part of the second revolution the projection 9 on the rack-bar 10 strikes the outer edge of the slide 5, forcing said slide inward against the tail portion 3' of the pivoted jaw 3 of the knotter, causing said jaw to open away from the rigid jaw 2, so that the two stretched strands of the cord are caught between said jaws, and at this movement the pivoted jaw is released and grasps said ends between the two jaws. At the moment the pivoted jaw closes, the lug 16 enters the part 25 of the cam-groove on the stationary rack-bar, and the arm $A^5$ turns the shaft 15, so that the arm $A^6$ makes an upward movement, slipping from under the cord which is stretched across it by having slipped behind the cutter $A^4$, and releases the end of the cord which was held between it and the finger 14, and it makes its next downward movement when the pinion has left the teeth of the rack-bar, the knot-tyer has come to rest, and the lug 16 passes out of the lifting part 25 of the cam-groove and passes into the curved continuation, which forces the lug downward. This downward movement causes the cord to be severed where it is stretched across the cutter $A^4$, and its end leading from the ball is at the same time jammed between the arm $A^6$ and finger 14, ready for another binding operation. The cord being severed, the knot is drawn off the knotter, and the bundle removed by the action of the ejector, which will now be described, together with the operation of the devices which move the compressor-arm out of the path of the bundle. The two upwardly-projecting inclined timbers $a^2$ have journaled in their ends a shaft, V, from the middle portion of which two arms, M M, extend downwardly, and have their lower portions bent inward and formed into hooks M' M', one of the hooks standing on each side of the binder-arm, and free to pass said arm and strike the bundle which lies in front thereof.

From the end of the shaft V there extends a crank-arm, H, having a wrist-pin, H', which enters a slot in the upper end of a bent lever, $Q^2$, which is pivoted at its elbow on a pin, $q^2$, extending outwardly from the inclined timber $a^2$, which is adjacent to the spur-wheel E. The lower end of this lever $Q^2$ is provided with a friction-roller, $Q^3$, which runs in the cam-groove $E^2$ on the inner face of the spur-wheel E, this cam-groove being of such shape as to give the proper movements to the arms M in ejecting the bundle and returning them to their proper positions.

In the earlier part of the movement of the spur-wheel B the spur-wheel E is positively held from moving by the cross-head $d^2$, which catches against the shoulder $E^4$, until the lug $b'$ of the wheel B strikes the lug $E^3$ of wheel E. By this time the inclined portion $b^3$ of the groove-cam $B^2$ on wheel B has raised the cross-head $d^2$ of the latch arm $d$ above the shoulder $E^4$, which held it, so that the wheel E is free to move, and the lug $b'$ carries it along until it runs into gear with the broad toothed pinion F, and the two wheels B and E revolve together until the wheel B has finished its revolution and is brought to a positive rest by the cross-head of the latch coming in contact with the shoulder $b^4$. The wheel E, however, continues its revolution, as its cam-track is formed on a smaller circle than is the track of wheel B, and receives the inner end of the cross-head of the latch, while its outer end is against the shoulder $b^4$ on the wheel B. Now, as the wheel E progresses the cam-groove $E^2$ acts upon the roller $w$ of the arm $L^2$ to throw said arm downward, causing the rack L to turn the segmental pinion K, which causes the tubular shaft G also to turn in the direction of the arrow and carry the compressor-arm I away from in front of the bundle. As soon as said arm is out of the path of the bundle the cam-groove $E^2$ acts upon the roller $Q^3$ to move the lever $Q^2$, and through the crank-arm H and shaft V to vibrate the arms M M, so that they will drive the bundle out across the table T and discharge it over the harvester-wheel. The wheel E then continues its revolution until it runs out of gear with the pinion F, and is brought to rest by the shoulder $E^4$ again striking the cross-head of the latch-bar, which has just been thrown down by the inclined portion of the cam immediately preceding the said shoulder. This finishes the movement of the various parts, and they stand in their original positions, ready to repeat the operation of forming the gavel, binding, and discharging it.

On the lower portion of the rack-bar 10 will be observed a series of short teeth, 26. These teeth are for the purpose of engaging the pinion 6 in case it and the knot-tyer 2 should not be in proper position, which is with the cut-away teeth of the pinion outward and the jaws projecting inward between the shoulder $A^7$ and $A^8$. If the pinion 6 is in its proper position, the teeth 26 are too short to engage the cut-away teeth of the pinion; but if it is not in proper position, said teeth will engage the long teeth of the pinion and give it such a movement as to bring the cut-away teeth outward.

It will be observed that the spur-gears B and E have long teeth $y^2$, of coarse pitch, so that I thus secure a gear which is but little liable to derangement by the rough usage of the field, and, in order to give these teeth a broad edge surface which will prevent liability of disengagement, I form a flange, $y^2$, around the edge of each tooth, and I am thus able to make the main body of the wheel and teeth thin and light, while at the same time the flanges thoroughly brace the teeth and render them able to stand rough usage.

Having fully described my invention, what I claim as new, and desire to secure by Letters Patent, is—

1. In a grain-binder, the combination, with the grain-receiver and devices for forcing the cut grain into the same, of a binder-arm or cord-carrier arranged to be started into action by the direct pressure of the grain thereupon, substantially as set forth.

2. In a grain-binder, the combination, with a grain-conveying apron, and a grain-receptacle arranged to receive the cut grain directly from said apron, of a binder or cord-carrying arm arranged to receive pressure direct from said grain as the receptacle is filled, and to be started into action by a predetermined degree of such pressure, substantially as described.

3. The combination, with the binder-arm and its shaft, and means for giving said shaft a complete rotation, of the compressor-arm fixed upon a sleeve surrounding said shaft, and means for holding said compressor-arm stationary during the early part of the movement of the binder-arm, then rotating it with the binder arm, and finally carrying it away from the gavel when the binder-arm stops, substantially as set forth.

4. The combination, with the binder-arm and its shaft, and the compressor-arm and its tubular shaft inclosing the binder-arm shaft, of the fixed gear-wheel on the binder-arm shaft, and loose gear-wheel also on said shaft, each provided with the cam-groove, substantially as described, a suitable latch operating in connection with said cam-grooves, and means for transmitting motion from the loose gear-wheel to the tubular shaft carrying the compressor-arm.

5. The combination, with the binder-arm shaft, the fixed and loose gear-wheels mounted on said shaft, and having the cam-grooves substantially as described, devices for engaging said wheels together, a suitable latch operating in connection with said cam-grooves, a gavel-ejecting mechanism, and intermediate devices for communicating motion to the same from said loose spur-wheel.

6. The combination, with the binder-arm arranged to stand normally athwart the exit-opening of the grain-receptacle, and fixed upon the shaft C, of the fixed and loose mutilated gear-wheels mounted on said shaft, and having the cam-grooves, substantially as described, means for engaging said wheels temporarily together, a suitable latch operating in direct connection with said cam-grooves, the pinion F, arranged to engage with both of said gear-wheels, and devices for transmitting motion from the loose gear-wheel to compressor-arm and gavel-ejecting devices.

7. In a grain-binder, a revolving binder-arm, and a revolving and vibratory compressor-arm arranged to move about the same center, said binder and compressing arms co-operating to form the gavel, substantially as described.

8. The combination, with the revolving binder-arm, of the cord-grasping spring $A^2$, suitable devices for throwing said spring outward at the proper time, and means for holding the cord in position to be grasped by said spring, substantially as set forth.

9. The combination, with the revolving binder-arm, of the short slotted shaft 1, carrying the fixed jaw 2, and flanged pinion 6, the spring-pressed movable jaw 3, pivoted in the slot of said shaft, the slide 5, arranged to operate the said pivoted jaw, substantially as described, and the rack-bar 10, provided with means for operating said pinion and slide.

10. The combination, with the revolving binder-arm and its cord-grasping spring $A^2$, of the finger 14, forming a cord-guide, the stationary cutter $A^4$, and the cord-jamming arm $A^6$, arranged to play between said lug and the cutter, substantially as and for the purpose set forth, and suitable means for operating said cord-jamming arm.

11. The combination, with the binder-arm revolving on a pivot and carrying the cord tying, holding, and cutting devices, as described, of the cord-holding arm pivoted on the binder-arm and having a laterally-projecting lug, and the stationary rack-bar provided with a cam-groove for engaging the lug of said arm for forcing said holding-arm in position to press the cord upon the cutter, and to simultaneously grasp said cord at one side of the point at which it is secured, substantially as set forth.

In testimony whereof I have signed this specification in the presence of two subscribing witnesses.

FERRIS OGDEN.

Witnesses:
H. D. KEITH,
JAMES P. SEWARD.